Patented May 15, 1934

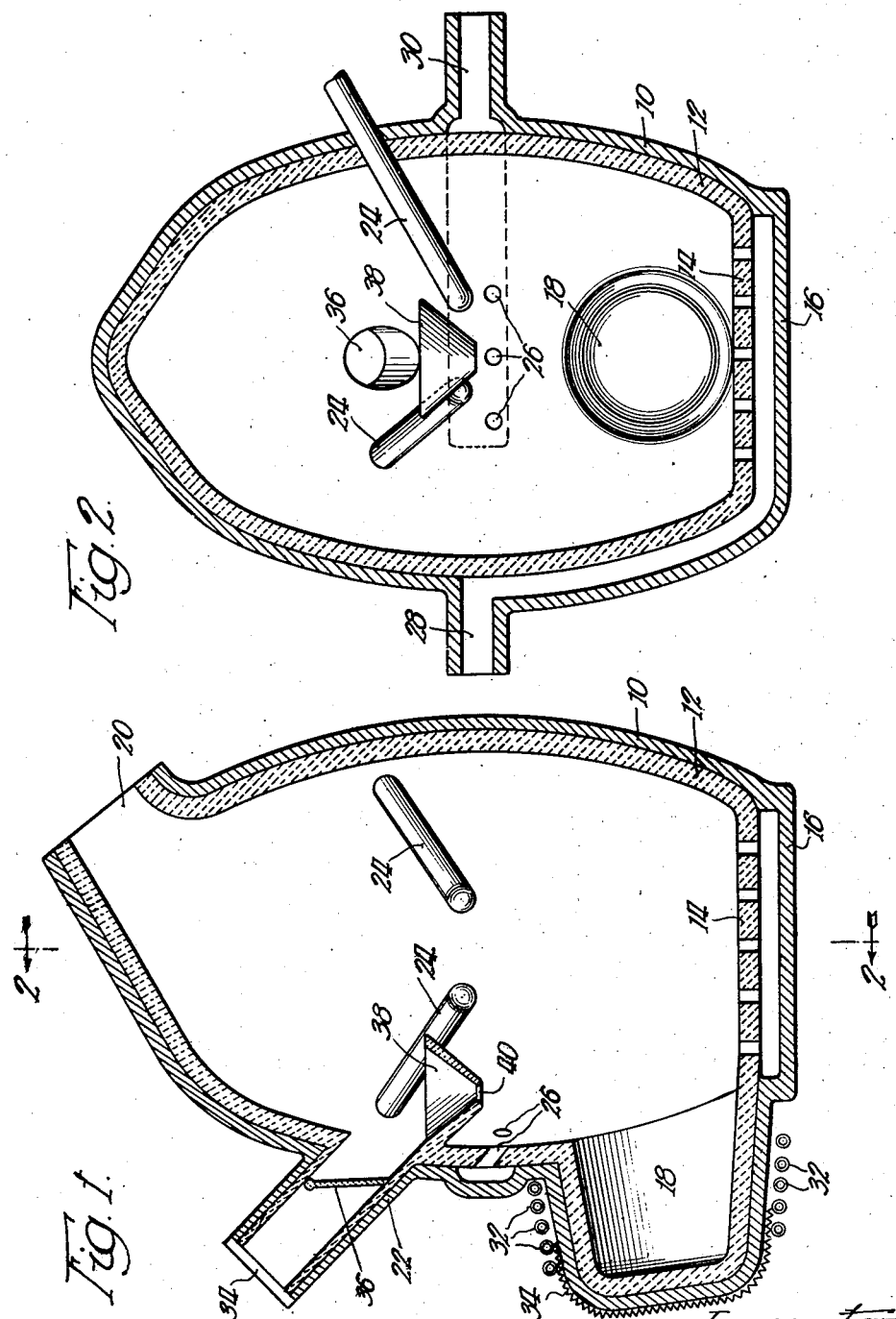

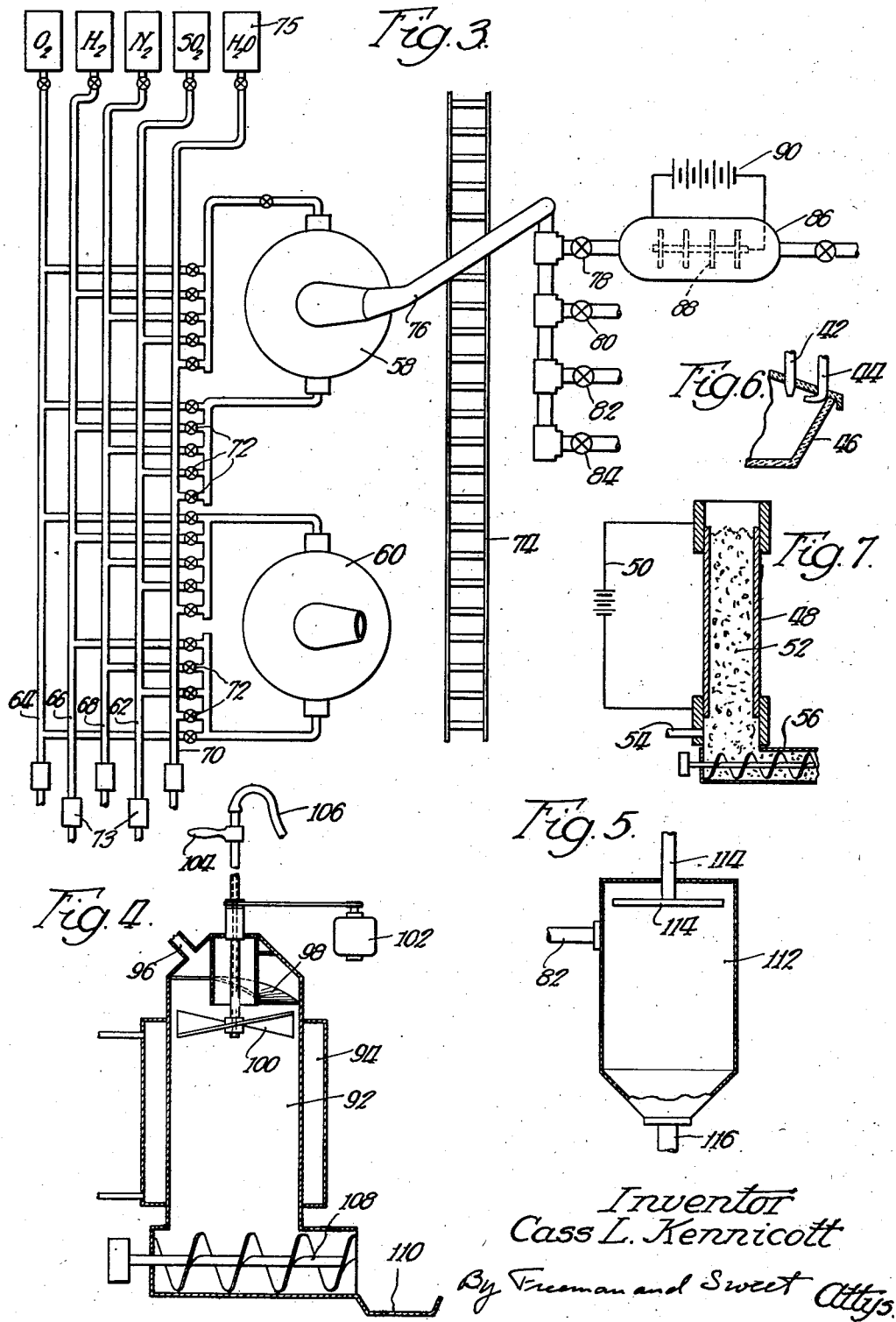

1,958,581

UNITED STATES PATENT OFFICE 1,958,581

ORE TREATMENT

Cass L. Kennicott, Flossmoor, Ill.

Application April 18, 1932, Serial No. 605,876

10 Claims. (Cl. 75—60)

My invention relates to ore treatment both with respect to metallurgical results and with respect to the recovery of the non-metallic elements included in certain ores as well as the metallic elements, for the advantageous use of both.

In the accompanying drawings:

Figure 1 is a vertical section of a converter of the Bessemer type;

Figure 2 is a vertical section on line 2—2 of Figure 1;

Figure 3 is a partial layout of an ore treating plant;

Figure 4 is a more or less diagrammatic showing of one sulphur-collecting means;

Figure 5 is a diagram of an alternative sulphur-collecting means;

Figure 6 is a diagram of an atomizer; and

Figure 7 is a diagram of a reducer for producing sponge metal.

In the embodiment of the invention selected for illustration, the converter illustrated in Figure 1 comprises the usual shell 10 and lining 12 equipped with the perforate bottom 14 and the imperforate bottom 16. It differs from ordinary converters in having a lateral recess or chamber 18 on the side opposite the spout 20 and in having ore charging means 22, electrodes 24 for electric arc heating, and a supplemental set of three tuyères 26 above the recess 18 and above the liquid level during operation. The blast for the bottom of the converter may enter through one trunnion 28 and the blast for the upper tuyères 26 may enter through the trunnion 30.

I will now describe the use of such a converter in recovering both the sulphur and the iron from a pyrite or pyrrhotite ore.

To start the process the converter is tipped back with the recess 18 lowermost and a preliminary melting charge is deposited in the recess. This melting charge may be either molten ferrous sulphide or molten steel or iron, in which case after turning on the blast under the bottom 14 the converter may be restored to the position of Figure 1. Or I may employ solid material and melt the same in recess 18. In melting a solid charge in the recess 18, I may employ a charge of ore and melt with the resistance coils 34, or I may include magnetic material such as metallic iron and generate in that iron by means of the water-cooled induction coils 32 the necessary heat to melt the entire charge.

As soon as the converter is back in the position of Figure 1 with the molten mass covering its bottom and the blast passing through the charge, additional ore is added through the charging device 22. Thus the cap 34 is removed and a charge of ore inserted, being held from entry into the body of the converter by the check flap 36. Then the cap is replaced and lifting the flap will cause the ore to be deposited in the preliminary heating pot 38 where the ore will be raised in temperature until it melts and falls through the opening at 40 in the bottom of the pot into the molten mass below. The size and location of the pot 38 with respect to the sources of heat, including the tuyères 26 and the electrodes 24, are arranged to provide a melting capacity that will fill the converter in a short time. During this heating and sintering, pyrite will lose approximately half its sulphur, representing the so-called feeble atom, which is less tightly held in the molecule than the fixed atom, representing sulphur of FeS. The addition of molten material to the charge is continued until the capacity of the converter is reached.

In decomposing pyrite or pyrrhotite ores I employ as a blast any of the gases indicated in Figure 3 except nitrogen. The oxygen blast operates by oxidizing both the iron and the sulphur and gives a strongly exothermic reaction. The hydrogen blast removes the sulphur from the iron, forming hydrogen sulphide and leaving the iron uncombined. The sulphur dioxide blast operates by double decomposition with the iron-sulphur compounds present to form iron oxide and sulphur, and the steam blast will form iron oxide and hydrogen sulphide. The reactions of the blasts of sulphur dioxide and steam are slightly endothermic, and the action of the hydrogen blast is slightly exothermic. Various combinations or alternations of the four blasts mentioned may advantageously be employed for heat control, as, for instance, the injection of a small amount of oxygen into the hydrogen blast to burn with part of that blast and thus increase the heat delivered and at the same time cause steam to form part of the blast actually acting on the charge. The excessive heating of the oxygen blast is readily controllable by diluting that blast, as with sulphur dioxide, or by using air instead of oxygen.

Having built up the charge to the capacity of the converter while at the same time carrying on the reactions destined to complete the disintegration of the ore into iron or iron oxide and sulphur, I now discontinue further charging and carry the reactions to completion. Thus, so far as the iron is concerned, two desirable products are available. The reaction may be carried by means of oxygen to leave a bath of pure iron oxide useful as such for various purposes, particularly gas purification, and the production of sponge iron according to various well known processes.

For producing sponge iron the molten oxide should be atomized as is well known in the art in the production of mineral wool. In Figure 6 I have indicated a pour spout 42 for the molten ore, a jet 44 for the atomizing blast, and a chamber 46 for receiving the product. In Figure 7 I have indicated a tube 48 heated by electric current from a source 50 down which the purified and granulated ore 52 passes through a rising stream of reducing gas entering through the inlet 54. The metallic sponge iron delivered at the bottom is mechanically moved away by the screw conveyor 56.

Where metallic iron is to be produced in the molten condition, the sequence or composition of the blasts is such as to carry oxidation of the iron no farther than necessary to maintain suitable temperature and eliminate the major portion of the sulphur, and the final blast will be a reducing gas such as hydrogen, ammonia, carbon monoxide or methane. In producing such iron the later stages of the reduction are carried on under a blanket of lime slag mixed with fluorspar.

As for the sulphur, a considerable proportion is delivered from the throat of the converter as elemental sulphur, but the different blasts also render available large quantities of sulphur dioxide and hydrogen sulphide, each of which may readily be used as such in other processes. Where elemental sulphur is the most valuable product, the hydrogen sulphide and sulphur dioxide are generated in substantially equivalent quantities and recombined to form water and elemental sulphur so that the entire sulphur content of the ore can be delivered in that form. Thus in Figure 3 I have illustrated two converter units 58 and 60, one of which can be used with a blast generating sulphur dioxide at a time when the other is operating with a blast generating hydrogen sulphide and the gases discharged from the converters can be mixed as they issue to complete the reaction immediately.

Another advantageous interrelation between two converters is to use one to generate sulphur dioxide and to compress that sulphur dioxide and use it as a blast for the other converter.

More specifically, in Figure 3 I have illustrated a bank of supply mains including a main 62 for sulphur dioxide, a main 64 for oxygen, a main 66 for hydrogen, a main 68 for nitrogen, and a main 70 for steam, and multiple connections including banks of valves at 72 whereby either trunnion of either converter will be supplied with blast from any one of the supply mains or with a mixture of the blast from a plurality of them.

Each supply main is connected to a compressor 73 at one end and has a storage reservoir 75 at the other end.

The nitrogen blast is available for sweeping out of the upper portion of the converter any traces of gases or suspended particles that might be reabsorbed by the charge and constitute undesirable impurities, such, for instance, as traces of sulphur dioxide at a time when the blast is being changed to straight hydrogen or ammonia to complete the purification of a charge of pure molten iron.

Referring further to Figure 3, I have illustrated the converters 58 and 60 ranged alongside a railroad track 74, on which suitable ladles are provided for taking away iron or other finished products.

Independent of the combined use of a plurality of converters, each converter is provided with an uptake pipe 76 connected to a plurality of valve outlets 78, 80, 82, and 84. The outlet 78 leads the gases from the converter through a separator of the Cottrell type diagrammatically indicated at 86 with a central electrode 88 and a source of potential 90. The valved outlet 80 is connected to a vertical tube condenser comprising a tube 92 watercooled at 94. The sulphur enters at 96 and is given a swirling motion by a spiral deflector 98 and condenses on the watercooled walls below. A rotary scraper 100 is driven by a motor 102, and may be raised and lowered to scrape the condensed sulphur off the walls of the tube by means of the handle 104. Fixed gases entering with the sulphur find an exit at 106 through the tubular shaft driving the scraper, and the solid sulphur accumulating at the bottom of the tube is discharged by a worm conveyor 108 into a receiver 110.

The valved outlet 82 discharges into a wash recovery tower 112 provided with the liquid spray means 114 at the top and an outlet 116 through which the mixed sulphur and liquid flows out. For a liquid spray I use acidulated water or water containing a metallic salt in solution to avoid the formation of colloidal suspension of sulphur. A colloidal suspension is readily obtainable by the use of pure water in case milk of sulphur is desired for therapeutic purposes or plant spray. Where the ore contains cobaltite or arsenopyrite, the discharged gases are particularly useful for plant spray and the like.

Many of the sulphide ores of North America are found in situ contaminated with sulphides of other metals. The treatment of such sulphide ores as above outlined will deliver the other metals in the metallic form alloyed with the iron and in many instances ores otherwise incapable of commercial use are rendered more valuable than plain ores rather than less so by reason of the quality of the alloys that may thus be obtained direct from the original ore. Thus, most of the pyrrhotite ores contain a minor percentage of nickel sulphides, and the treatment of such ores by the above outlined process will give a nickel iron alloy of additional value by reason of the presence of the nickel.

Another large source of very cheap material is the residue from the pyrite burners used in the paper industry, in which the ore has been roasted to remove the feeble atom and some iron oxide has been formed.

Where the metal is desired in the metallic form or in the form of an oxide, the process is not limited to sulphide ores but is equally applicable to such complex mixtures as the pegmatite deposits of Maine and North Dakota, Manitoba and Ontario, heretofore considered worthless except in rare instances where some particular ingredient is of sufficient value to justify treatment of the material for that ingredient alone. After the decomposition of the sulphides the charge is amenable to subsequent reduction as above outlined.

Without further elaboration the foregoing will so fully explain my invention that others may, by applying knowledge current at the time such application is made, readily adapt the same for use under various conditions of service.

I claim:

1. In a process for the commercial treatment of ores, the step of blowing sulphur dioxide through a bath containing molten sulphides, to form oxides and liberate sulphur by double decomposition with the sulphides.

2. In a process for the commercial treatment of ores, the step of blowing oxygen through a bath containing molten sulphides, to form metallic oxides and sulphur dioxide, and the step of blowing the sulphur dioxide liberated through another molten bath containing sulphides, to form metallic oxides and liberate elemental sulphur, said steps being performed alternately on a given molten bath to complete the change of the entire bath from sulphides to oxides.

3. In a process for the commercial treatment of ores, the steps of maintaining a plurality of molten baths containing sulphide ore, reacting on each bath alternately with oxygen blast and with sulphur dioxide blast, using the sulphur dioxide produced by the oxygen blast to form the sulphur dioxide blast, and keeping different masses on different blasts to reduce storage of sulphur dioxide.

4. In a process for the commercial treatment of ores, the steps of maintaining a plurality of molten baths containing sulphide ore, reacting on one mass with oxygen blast and on the other with sulphur dioxide blast, and using the sulphur dioxide produced by the oxygen blast to form the sulphur dioxide blast.

5. The method of producing pure metal, which comprises melting an ore of the metal, purifying the ore by a blast of gas blown through it, while keeping it in a molten condition, changing the molten purified ore to a solid granular condition, and chemically reducing the purified solid ore to sponge metal.

6. In a process for the treatment of ores, blowing sulphur dioxide through a molten bath containing metallic sulphides, to react by double decomposition and form metallic oxides and sulphur, and simultaneously supplying additional heat to maintain the temperature of the bath.

7. In a process for the treatment of ores, blowing sulphur dioxide through a molten bath containing metallic sulphides, to react by double decomposition and form metallic oxides and sulphur, and simultaneously supplying additional heat to maintain the temperature of the bath by an electric arc near the surface of the bath.

8. The treatment of metallic sulphide ores to decompose them and recover both the metal and the acid constituents, which comprises warming the ore in a preliminary stage substantially without chemical reaction, as by conduction and radiation, to drive off any sulphur releasable by heating only; melting the heated ore and passing a gaseous blast through it, the blast being changed from time to time according to a predetermined sequence; employing a blast of sulphur dioxide to react with the molten sulphide and form sulphur, and a metallic oxide; employing a blast of hydrogen to remove sulphur from the metal in the form of hydrogen sulphide, and oxygen from the metal in the form of steam; employing a blast of oxygen to remove sulphur in the form of sulphur dioxide; and employing the various blasts in a predetermined sequence with hydrogen for the final blast to complete the reduction of any oxide present and the scavenging of sulphur.

9. The treatment of metallic sulphide ores to decompose them and recover both the metal and the acid constituents, which comprises: melting the heated ore and passing a gaseous blast through it, the blast being changed from time to time according to a predetermined sequence, employing alternate blasts of sulphur dioxide and oxygen until a major portion of the sulphur has been removed, and finishing with a blast of hydrogen to remove sulphur from the metal in the form of hydrogen sulphide, and oxygen from the metal in the form of steam.

10. The treatment of metallic sulphide ores to decompose them and recover both the metal and the acid constituents, which comprises: melting the heated ore and passing a gaseous blast through it, the blast being changed from time to time according to a predetermined sequence, employing alternate blasts of sulphur dioxide and oxygen until a portion of the sulphur has been removed, and finishing with a blast of hydrogen to remove sulphur from the metal in the form of hydrogen sulphide, and oxygen from the metal in the form of steam.

CASS L. KENNICOTT.